Nov. 4, 1969 — G. J. HEH — 3,476,635
GRADUATED DENSITY FILAMENTOUS MAT
Filed July 11, 1966
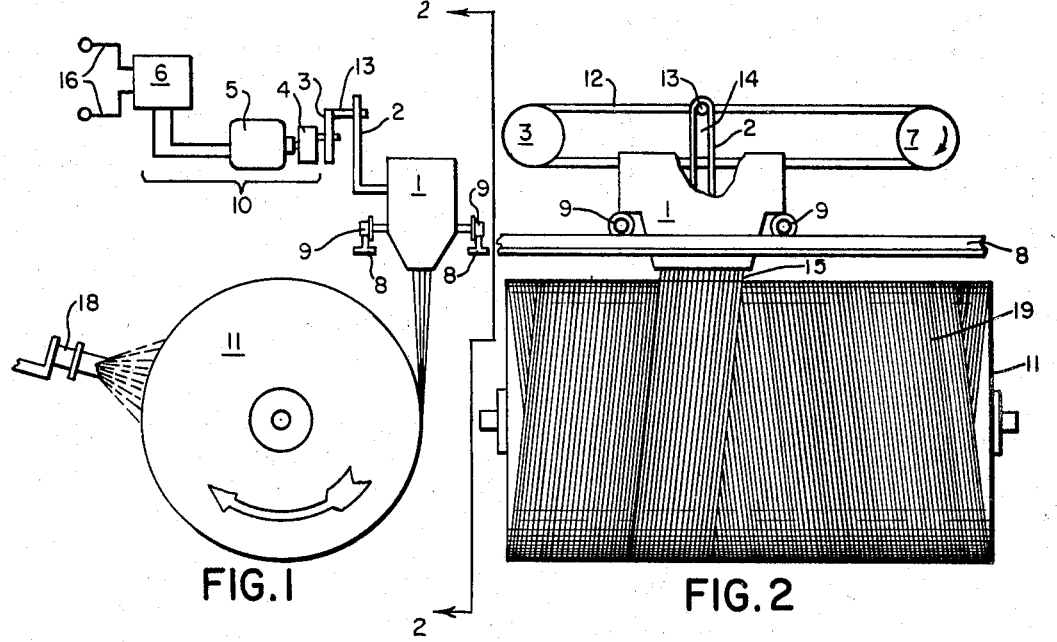
FIG. 1
FIG. 2
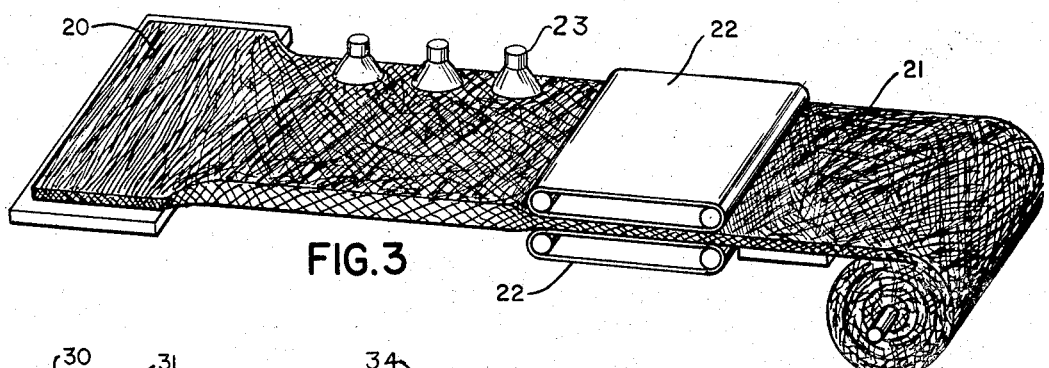
FIG. 3
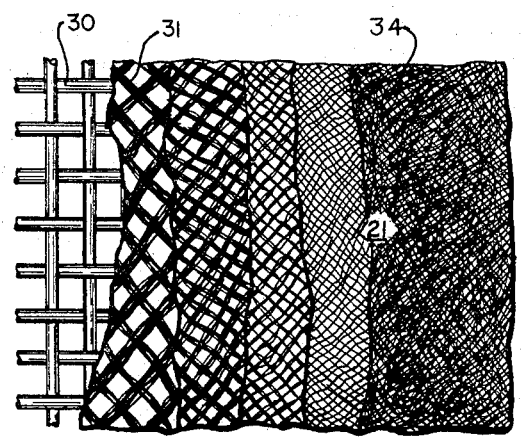
FIG. 4
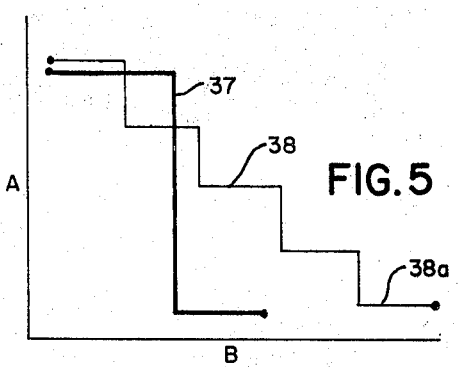
FIG. 5
INVENTOR.
GEORGE J. HEH
BY Edward M. Steuterman
ATTORNEY

United States Patent Office 3,476,635
Patented Nov. 4, 1969

3,476,635
GRADUATED DENSITY FILAMENTOUS MAT
George J. Heh, Louisville, Ky., assignor to American Air Filter Company, Inc., Louisville, Ky., a corporation of Delaware
Filed July 11, 1966, Ser. No. 564,370
Int. Cl. D04h *3/12;* B31c *13/00*
U.S. Cl. 161—60    5 Claims

ABSTRACT OF THE DISCLOSURE

A surfacing mat to be used with a reinforcing mat for a molded plastic laminate where the surfacing mat has fibers of selectively graduated diameter through the depth of the mat to provide a smooth surface for the molded plastic laminate in which the combination is used.

Background of the invention

Fiberous mats, for example expanded mats of drawn glass fibers, are widely used as reinforcing media in molded plastic laminates where a reinforcing mat is placed in a matched mold and the mold is filled with plastic which is hardened. Such laminated plastic articles, ordinarily require considerable postmolding surface preparation before a finish can be applied to the exposed surfaces because the plastic used in the laminate shrinks as it hardens so that the pattern of the fibers of the reinforcing mat is projected to the surface of the article and results in an uneven surface with undesirable crests and valleys. Preparing the surfaces of such plastic laminates is expensive and includes several operations of sanding, polishing, and priming before final surface coating.

Two methods are generally used to minimize postmolding surface preparation required before applying a finish to the exposed surfaces. Basically, in both methods, the surface of the article is made smoother by increasing the concentration of plastic at the surface.

One method presently used to provide a smooth surface on a plastic laminate includes the use of a gel coat which is a fast curing resin applied to the mold before the laminate is formed so the coating adheres to the surface of the article when the article is removed from the mold. Such gel coats are expensive and fairly difficult to use in manufacturing laminated articles in matched metal molds.

The second method to provide a smooth surface on a laminated article includes the use of a surfacing mat which is most often used when the laminated article is to be manufactured in a heated, matched metal mold. Previously surfacing mats have been composed of fine fibers and have been laid over the reinforcing mat, before the formation of the laminate, to prevent direct projection of the pattern of the fibers of the reinforcing mat onto the surface of the article. Surfacing mat is much easier to use than gel coating but the surfaces provided by previous surfacing mats have been inferior to the surface provided by gel coating and, even when previous surfacing mats have been used, considerable post-molding surface preparation has still been required before a finish coat could be applied to the surface of such laminated articles. In many cases, where previous surfacing mats are used, the laminate has a poor surface because the fiber pattern of the reinforcing mat is projected through the surfacing mat to the surface of the laminated article and in such instances extra thick surfacing mats are required. Such thick surfacing mats increase the thickness of the glass layer in the laminated article and in some instances, for example when extremely thin articles are to be made, the increased thickness precludes the use of such surfacing mats.

Summary of the invention

In accordance with the present invention, a new and improved surfacing mat and reinforcing mat combination is provided for laminated plastic articles which, it has been recognized, gives additional strength to the laminate, provides a smooth surface to significantly reduce the amount of post-molding surfacing preparation required before applying a finish to the molded article, and therefore reduces the expense of manufacturing such articles. It has also been recognized that in some instances the novel surfacing mat—reinforcing mat arrangement in accordance with the present invention completely eliminates post-molding surface preparation required by laminates formed with previous surfacing mats.

Furthermore, it has been recognized that the arrangement in accordance with the present invention significantly reduces the thickness of the surfacing mat required to prevent projection of reinforcing mat fibers patterns to the surface of a laminated article and can be used in the manufacture of reinforced laminated articles of selected thickness.

More particularly, the present invention provides, in combination for use in a plastic laminate: an elongated fiberous reinforcing mat; and, an expanded elongated fiberous surfacing mat having layers of separated intercrossing fibers extending generally longitudinally through the surfacing mat, the surfacing mat having first layers of longitudinally extending fibers including fibers of large diameter adjacent a first surface of the surfacing mat and generally parallel adjacent layers of fibers where the maximum diameter of the fibers of the adjacent layers decrease toward the surface of the surfacing mat opposite the first surface and wherein the surfacing mat is disposed adjacent the reinforcing mat so the first layers including the large diameter fibers are in contiguous relation with the reinforcing mat.

It is to be understood that various changes can be made in the configuration of the fiber mats disclosed herein without departing from the scope or spirit of the present invention.

Referring to the drawings:

FIGURE 1 shows a side view of an apparatus for forming a fiber mat on a rotating drum;

FIGURE 2 is a view taken through a plane passing through line 2—2 of FIGURE 1;

FIGURE 3 is an isometric schematic view of the expansion of a fiber mat of the present invention;

FIGURE 4 is an enlarged plan view partly in section showing successive layers of a fiberous mat in accordance with the present invention; and FIGURE 5 is a graph illustrating variations in average fiber diameter through the depth of selected fiber mats in accordance with the present invention.

The drawing shows an example of a fiberous mat in accordance with the present invention and illustrates an example of a method for making such mats. In FIGURES 1 and 2 filament feeder 1 axially traverses a rotating drum 11 and filaments 15 are drawn from the drum to form a condensed mat 19 which has successive overlying layers of filaments or fibers (which for purposes of the present invention can, if so desired, include monofilaments and groups of monofilaments associated to form a strand, as hereinbefore described). Mat 19 is removed from drum 11 by slitting the mat axially of the drum to form a planar mat 20. As is known in the art, and shown in FIGURE 3, mat 20 is expanded by pulling the edge of the mat generally parallel to the lay of the fibers in a direction generally transverse the lay of the fibers. Pulling the mat separates the fibers, elongates the mat in the direction of pull, and expands the mat in thickness while decreasing the width of the mate to form an expanded mat 21. In accordance with one example of the present invention, as shown in FIGURE 4, expanded mat 21 includes fibers 31 of large diameter adjacent one surface of the mat and decreasing the fiber diameter in successive layers so there is a layer of fine fibers 34 of much smaller diameter at the opposite surface of the mat.

More particularly, the present invention provides a surfacing mat in combination with a reinforcing mat, which is useful in a reinforced molded plastic laminate where the surfacing mat includes successive layers of fibers of graduated diameter selectively distributed through the thickness of the mat so the average diameter of the fibers decreased toward one outer surface of the mat. While fiberous mats of varied fiber diameter are known in the art, it has been recognized in accordance with the present invention that by selectively varying the average fiber diameter through the thickness of a fiberous mat, a surfacing mat is formed for use in a new and useful combination with a reinforcing mat in the manufacture of plastic laminates.

As explained hereinbefore, reinforcing mats are generally composed, throughout, of relatively large diameter fibers and when such mats are used to reinforce a plastic laminate the pattern of the large diameter fibers of the reinforcing mat are undesirably projected onto the surface of the laminate article. Surfacing mats can be placed over reinforcing mats before the formation of the plastic laminate and it has been found that a comparatively thin layer of surfacing mat in accordance with the present invention advantageously prevents such projection of the pattern of the large diameter fibers onto the surface of the laminated article. It will be noted in FIGURE 4, which shows an enlarged plan view of a section of surfacing mat 21 in accordance with the present invention laid on a reinforcing mat having large fibers 30, that surfacing mat 21 has large diameter fibers 31 adjacent one surface, and fine fibers 34 adjacent the opposite surface and fibers of selectively varied diameter in layers intermediate the opposite surfaces of surfacing mat 21. The diameter of fibers 31 can advantageously be smaller than the diameter of fibers 30 of the reinforcing mat and surfacing mat 21 is laid on the reinforcing mat so the open areas between fibers 30 of the reinforcing mat are bridged by the large diameter fibers 31 of mat 21. Fibers 31 are advantageously strong enough to bridge the openings between fibers 30 without significant interstitial deflection and the adjacent intermediate layers of decreasing diameter provides decreasing resistance to interstitial deflection to support the smaller diameter fibers of the mat without projecting the pattern of fibers 30 or 31 to fine fibers of the finish surface.

In accordance with the present invention, it has been found that by progressively decreasing the diameter of the fibers of mat 21 through the thickness of the mat from large diameter fibers 31 to small diameter fibers 34 the deformations imposed by large diameter fibers 30 of the reinforcing mat are progressively dampened and eliminated at the finish surface so a superior surface is obtained with a thinner surfacing mat.

Generally, to make a laminated article using a surfacing mat arrangement in accordance with the present invention, the surfacing mat is superposed on a reinforcing mat so the larger diameter fibers, such as fibers 31 of the mat of FIGURE 4, are in contiguous relation with fibers 30 of the reinforcing mat. The superposed reinforcing mat and surfacing mat are placed in a mold of desired shape so fine fibers 34 of mat 21 are at a surface of the article to be finished. The mold is closed to urge the surfacing mat and reinforcing mat into compressed relation and the unique features of the arrangement in accordance with the present invention prevent significant projection of the pattern of filaments of the reinforcing mat to the fine fiber surface of the surfacing mat. The mold is filled with selected amounts of plastic material to impregnate the reinforcing mat and the surfacing mat and form an article of desired shape when the plastic has hardened. The formed article is then removed from the mold after the plastic has hardened.

One method of making a fiberious mat in accordance with the present invention is shown in FIGURES 1, 2, and 3. Fibers of a selected material, such as molten glass, are fed from orifices (not shown) in the bottom of feeder 1 and are attenuated by and collected upon rapidly rotating drum 11. Feeder 1 is mounted on wheels 9 for reciprocatory motion along tracks 8 which are supported above and generally parallel to a downturning edge of rotating drum 11. The diameter of fibers 15 drawn from feeder 1 onto drum 11 is influenced by the speed of rotation of drum 11 and the diameter of the orifices in the bottom of feeder 1.

In the examples of FIGURES 1 and 2 feeder 1 is driven back and forth on tracks 8 in successive reciprocatory traverses by variable speed drive means 10. It will be understood that within the scope of the present invention drive means 10 can include any suitable combination of elements to selectively vary the traversing speed of feeder 1. In the example of FIGURES 1 and 2 a drive motor 5 can be connected to a variable speed reducer 4 to turn sprocket 3 at a desired speed. Endless chain 12 is driven by sprockets 3 and passes around idler sprocket 7 where sprockets 3 and 7 are mounted at opposite ends of the axis of drum 11. Drive pin 13 is fixed to chain 12 and nests in a vertically extending, pin receiving slot 14 of vertically extending arm 2 which is joined to filament feeder 1. Pin 13 is free to move in a generally horizontal direction on tracks 8 in response to the movement of chain 12. For example, pin 13 moves with chain 12 on one horizontal direction between sprockets 3 and 7 to drive feeder 1 accordingly. When pin 13 reaches one of the sprockets, for example sprocket 3, it moves around sprocket 3 in a generally vertical direction in slot 14. As pin 13 leaves sprocket 3, feeder 1 is driven at the same horizontal speed as chain 12 but in a direction opposite to the direction of travel before pin 13 passed around sprocket 3. It will be noted that a similar sequence of events occurs when pin 13 passes around sprocket 7 and therefore, the reciprocatory traverse of feeder 1 extends generally from sprocket 3 to sprocket 7 along the aforementioned downturning edge of rotating drum 11.

The traversing speed of feeder 1 is changed in accordance with the speed of drive motor 5, and can be controlled in a desired manner. The drive motor 5 can be periodically stopped and stopping the traversing motion of feeder 1 causes fibers to be wound directly from feeder 1 to drum 11 in overlying relation on the surface of drum 11. To stop and start motor 5 in a selected cycle a timer 6 can be installed in power supply 16 to motor 5 and can include sequence selecting switch means (not shown) to stop and start motor 5 in a selected sequence.

A suitable binder can be applied uniformly to mat 19 during its formation by means of spray 18 which can be arranged to periodically traverse the drum surface.

By periodically stopping feeder 1 in a selected cycle, individual fibers are wound directly to drum 11 on top of themselves to form large diameter fibers where the ultimate fiber diameter is determined by the number of filaments in the group. The group of individual fibers effectively form large diameter fibers such as fiber 31a and in further processing of the surfacing mat the large diameter fibers, composed of several small diameter individual fibers, have much the same effect as would a single large diameter fiber.

FIGURE 5 is a graph illustrating a change in average fiber diameter with depth for surfacing mats for use in combinations in accordance with the present invention. Axis A of FIGURE 5 represents the average fiber diameter while axis B represents the depth of the mat and the curve illustrates the change in average fiber diameter with mat depth. For example, a mat having a fiber diameter profile represented by line 37 of FIGURE 5 would have several layers of large diameter fibers and several layers of fine fibers. A mat having an average fiber diameter shown in line 38 would have stepwise regularly decreasing fiber diameter throughout the thickness of the mat.

In one method for making a condensed fiberous mat in accordance with the present invention the apparatus of FIGURES 1 and 2 can be used and the large fiber diameter portion of the mat can be formed by operating the feeder in cycles. For example, one cycle can include a first selected period during which the feeder traverses the rotating drum and then the feeder is stopped at some point along the axis of drum 11 for a second selected period of time. The large diameter fibers are formed when feeder 1 is stopped and fine fibers are deposited when feeder 1 traverses drum 11. The cycle is repeated a selected number of times so several layers of fibers, large and small, are deposited on the drum. It will be noted that each layer of the condensed mat will include a section of large diameter fibers if the period of the cycle during which the feeder traverses the rotating drum is less than the time required for the feeder to traverse the drum from one end to the other. The average fiber diameter at any part of the condensed mat is determined by the size and number of the large diameter fibers (composed of groups of individual fibers such as 31 of FIGURE 4) and the size and number of small diameter (individual) fibers such as fibers 34 in the example of FIGURE 4. To decrease the average fiber diameter in successive layers, and to provide maximum support for the fine fiber surface and maximum resistance to the projection of the fiber pattern of the reinforcing mat, the length of the stop period in each cycle can be decreased in a selected manner as the mat is built up on the rotating drum. For example, if the portion of the mat having the largest diameter fiber is formed during a cycle when the stop period is six seconds, then the six second period can be gradually decreased as the mat is built on the drum while the length of the traversing period remains constant. In the example of a method for making a mat in accordance with the present invention as shown in line 38 of FIGURE 5, the total time required to form the mat is two hours. The initial cycle, during which the portion of the mat including large diameter fibers 31 is formed, includes four second traversing periods and six second stop periods. To decrease the average diameter of the fibers in a regular manner throughout the thickness of the mat, the length of the stop period is decreased by one and one-half seconds every twenty minutes. The stop period is eliminated during the last cycle of the formation of the mat so the surface layer is composed only of individual finer fibers 34 as represented by line 38a of FIGURE 5.

Another method (not shown) for forming a fiberous mat is accordance with the present invention includes varying the speed of rotation of drum 11. In this example feeder 1 traverses the rotating drum and the speed of rotation of drum 11 is relatively slow during the formation of the portion of the mat including the large diameter fibers. The decreased rotational speed of drum 11 causes less attenuation of filaments drawn from feeder 1 and therefore the diameter of the filaments is larger. As the mat is built up on the drum 11 the rotational speed of drum 11 is increased to correspondingly decrease the diameter of filaments drawn from feeder 1 and the portion of the mat which is to be exposed to the surface of the laminated article is formed when the speed of rotation of drum 11 is at a maximum.

The condensed mat formed on the drum by either of the aforedescribed methods is then split axially of the drum and removed from the drum 19 as a condensed planar mat 20. As shown in FIGURE 3, the mat is laid on a table and the edge of the mat, generally parallel to the lay of the fibers, is pulled in a direction generally transverse to the direction of lay of fibers so the mat expands in thickness, increases in length, and decreases in width. Furthermore, in expansion the fibers of the mat are opened in a manner similar to that of lazy tongs so the angles between fibers open to increase the porosity and reduce the density of the mat. The binder, applied by means of spray 18 during the formation, can be softened, for example by heat from heaters 23, during the pulling process. The surface of the expanded mat is in some instances wavy and the mat can be compressed a selected amount by passing the expanded mat through conveyors 22 (FIGURE 3) to smooth the surface and remove the waves. The binder is then rehardened (by means not shown) to preserve the flat surfaces while the mat is compressed. The surfacing mat so formed can then be combined with reinforcing mat in the manner hereinbefore described to provide the advantageous results of the combination, disclosed and claimed herein.

The invention claimed is:

1. In combination for use in a plastic laminate: an open weave fibrous reinforcing mat; and, an expanded elongated fibrous surfacing mat having contiguous, compressed layers of separated intercrossing fibers extending generally longitudinally through the surfacing mat substantially from one end of said mat to the other, said surfacing mat having first layers of longitudinally extending fibers including fibers of large diameter adjacent a first surface of the surfacing mat and generally parallel adjacent layers of fibers where the maximum diameter of the fibers of said adjacent layers decreases toward the surface of said mat opposite said first surface and wherein said surfacing mat is disposed adjacent said reinforcing mat so said first layers are in contiguous relation with said reinforcing mat.

2. The combination of claim 1 including selected hardened plastic material dispersed throughout said reinforcing mat and said surfacing mat.

3. The surfacing mat of claim 1 wherein said large diameter fibers of said first layers include groups of single filaments in contiguous relation and single small diameter filaments; and, said adjacent layers are composed of separated single small diameter filaments.

4. The combination of claim 1 wherein said large diameter fibers in said first layers and said maximum diameter fibers in said adjacent layers include groups of single filaments in contiguous relation; and, wherein said mat includes small diameter filaments selectively distributed in said first layers and said adjacent layers.

5. The surfacing mat of claim 4 wherein the diameter of said maximum diameter fibers in said adjacent layers is decreased by selectively decreasing the number of single filaments in each said maximum diameter fiber.

References Cited

UNITED STATES PATENTS

| | | | |
|---|---|---|---|
| 2,165,772 | 7/1939 | Walsh et al. | 161—154 XR |
| 2,505,045 | 4/1950 | Holcomb | 156—174 XR |
| 2,552,124 | 5/1951 | Tallman | 161—156 XR |
| 2,664,375 | 12/1953 | Slayter | 156—181 XR |
| 2,798,531 | 7/1957 | Jackson | 156—174 XR |
| 3,036,946 | 5/1962 | Jackson | 156—174 XR |
| 3,385,749 | 5/1968 | Hampshire | 161—60 XR |

FOREIGN PATENTS 962,817    7/1964    Great Britain.

ROBERT F. BURNETT, Primary Examiner

W. A. POWELL, Assistant Examiner

U.S. Cl. X.R.

156—174, 181; 161—82, 89, 156, 165, 166